United States Patent [19]
Galan et al.

[11] Patent Number: 5,012,584
[45] Date of Patent: May 7, 1991

[54] MARKING TOOL DRIVE SYSTEM FOR A DRAWING MACHINE OR SIMILAR TYPE OF MACHINE

[75] Inventors: Mario A. Galan; Bernardo A. Perez; Jose R. P. Gonzalez, all of Madrid, Spain

[73] Assignee: Investronica, S.A., Madrid, Spain

[21] Appl. No.: 374,082

[22] Filed: Jun. 29, 1989

[30] Foreign Application Priority Data

Jul. 1, 1988 [ES] Spain ............................ 8802085

[51] Int. Cl.$^5$ .................. G01D 15/24; B43L 13/00
[52] U.S. Cl. .................................. 33/18.1; 33/1 M
[58] Field of Search ......................... 33/18.1, 1 M; 346/139 R, 139 C, 141

[56] References Cited

U.S. PATENT DOCUMENTS

| | | | |
|---|---|---|---|
| 3,384,965 | 5/1968 | Sicking | 33/18.1 |
| 3,864,695 | 2/1975 | Nagashima | 33/18.1 X |
| 4,426,783 | 1/1984 | Gerber et al. | 33/18.1 X |
| 4,825,555 | 5/1989 | Murayama et al. | 33/18.1 X |

FOREIGN PATENT DOCUMENTS 1113057 11/1955 France ............................ 33/18.1

Primary Examiner—Harry N. Haroian
Attorney, Agent, or Firm—Kenyon & Kenyon

[57] ABSTRACT

A direct drive working tool drive system is provided for a drawing machine. Electromagnetic means move the working tool downward toward the working surface of the drawing machine. Resilient means move the working tool upward from the working surface. First and second stroke limit means limit the upward and downward movement of the working tool. The electromagnetic means, resilient means, and first and second stroke limit means are disposed coaxially with the longitudinal axis of the working tool. Suitably, the electromagnetic means comprise a magnetic core having the working tool fixed within it, with the magnetic core being disposed within a solenoid coil. The magnetic core and solenoid coil are disposed coaxially with the longitudinal axis of the working tool.

13 Claims, 5 Drawing Sheets

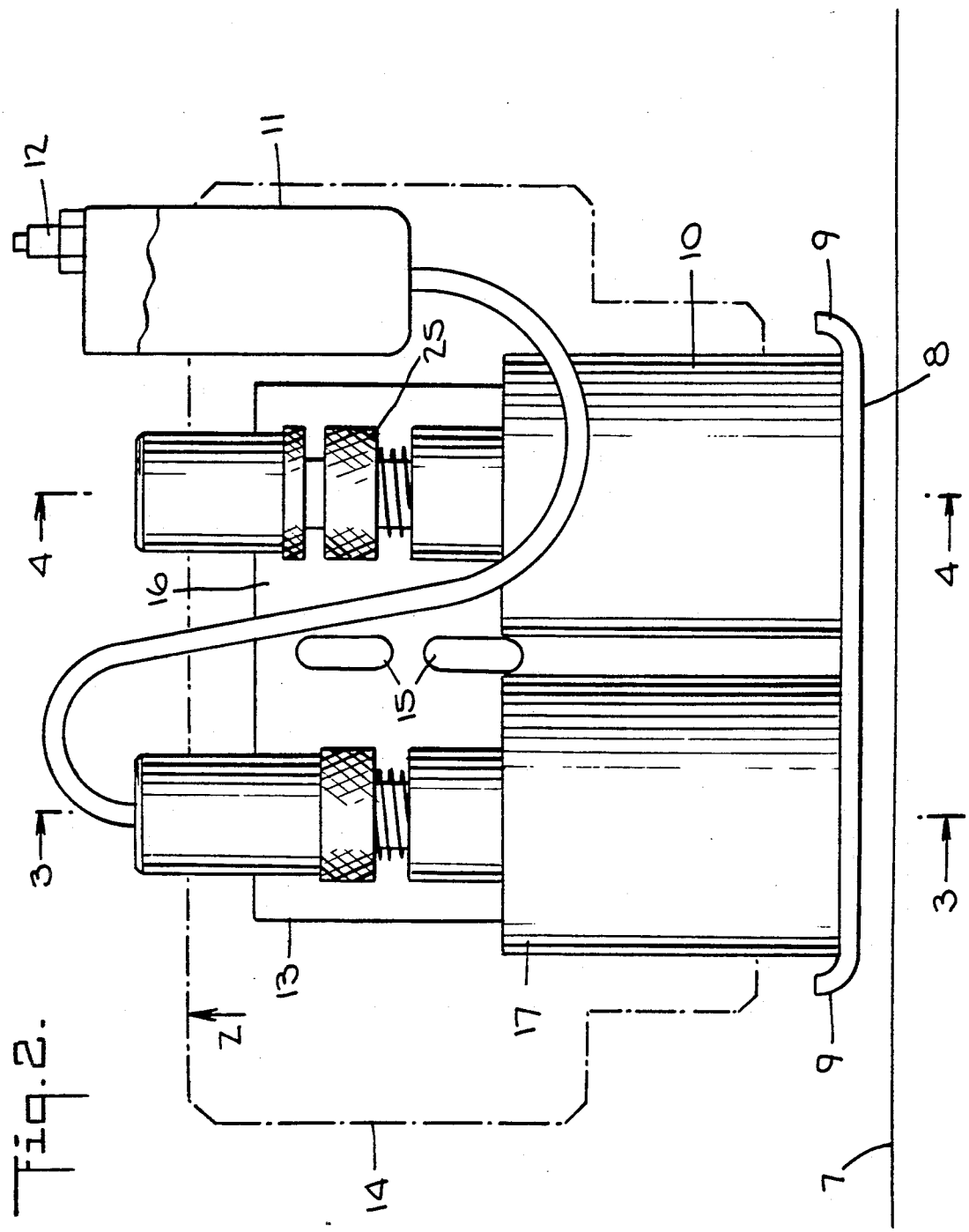

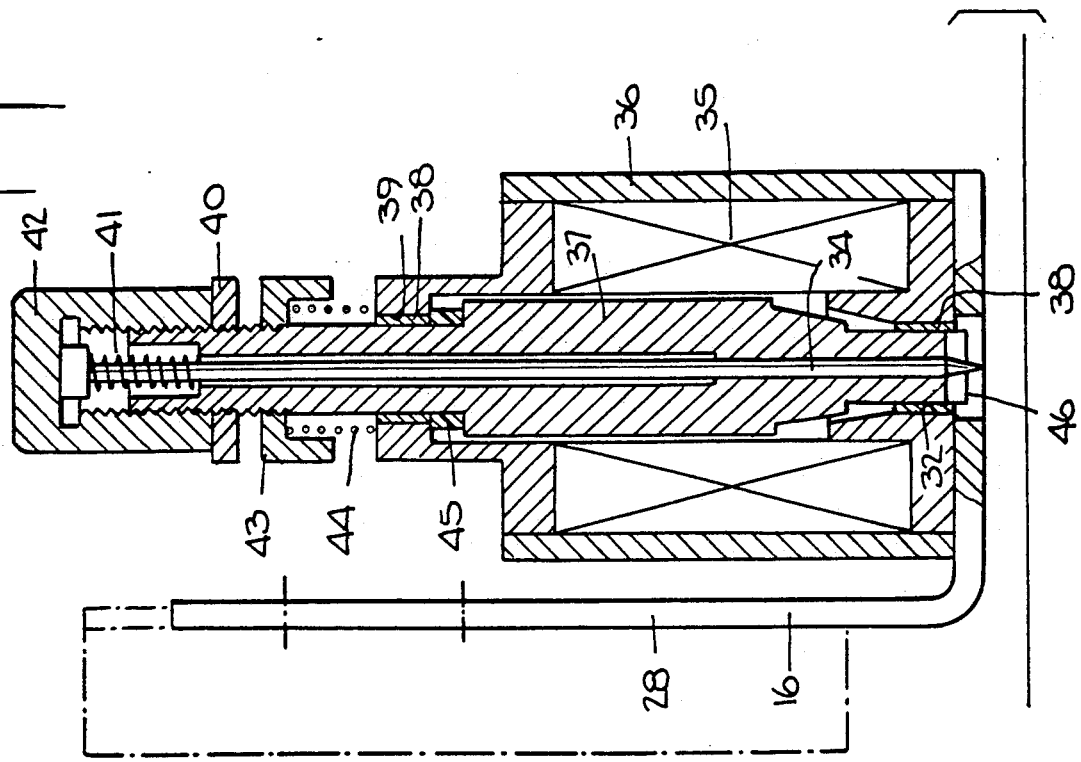
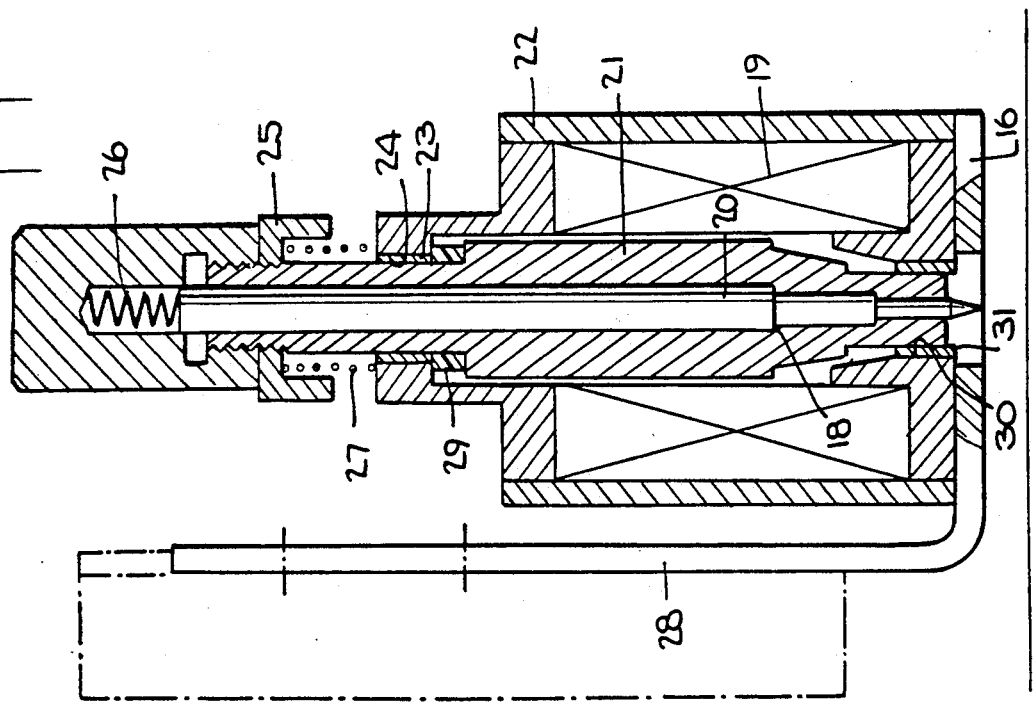

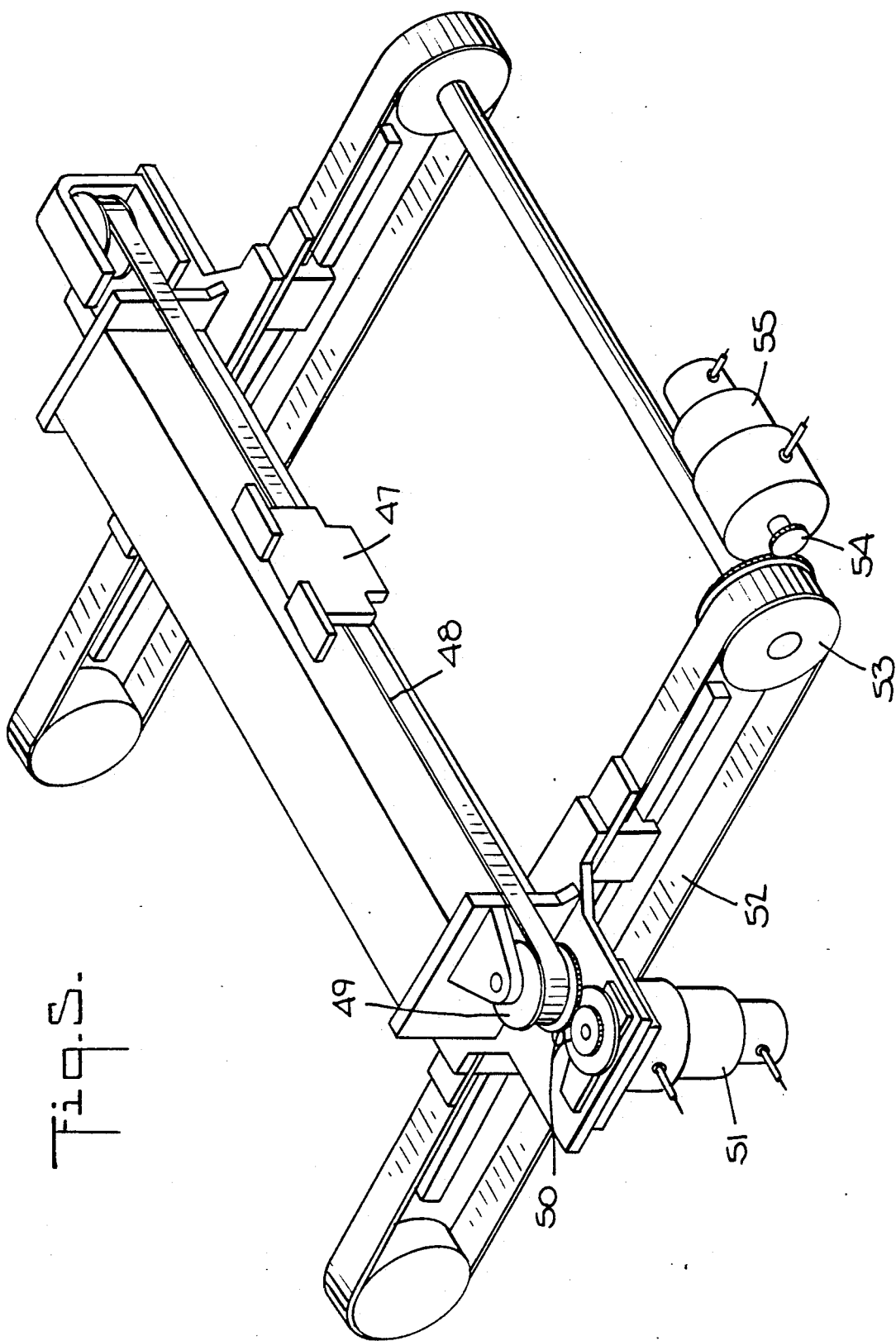

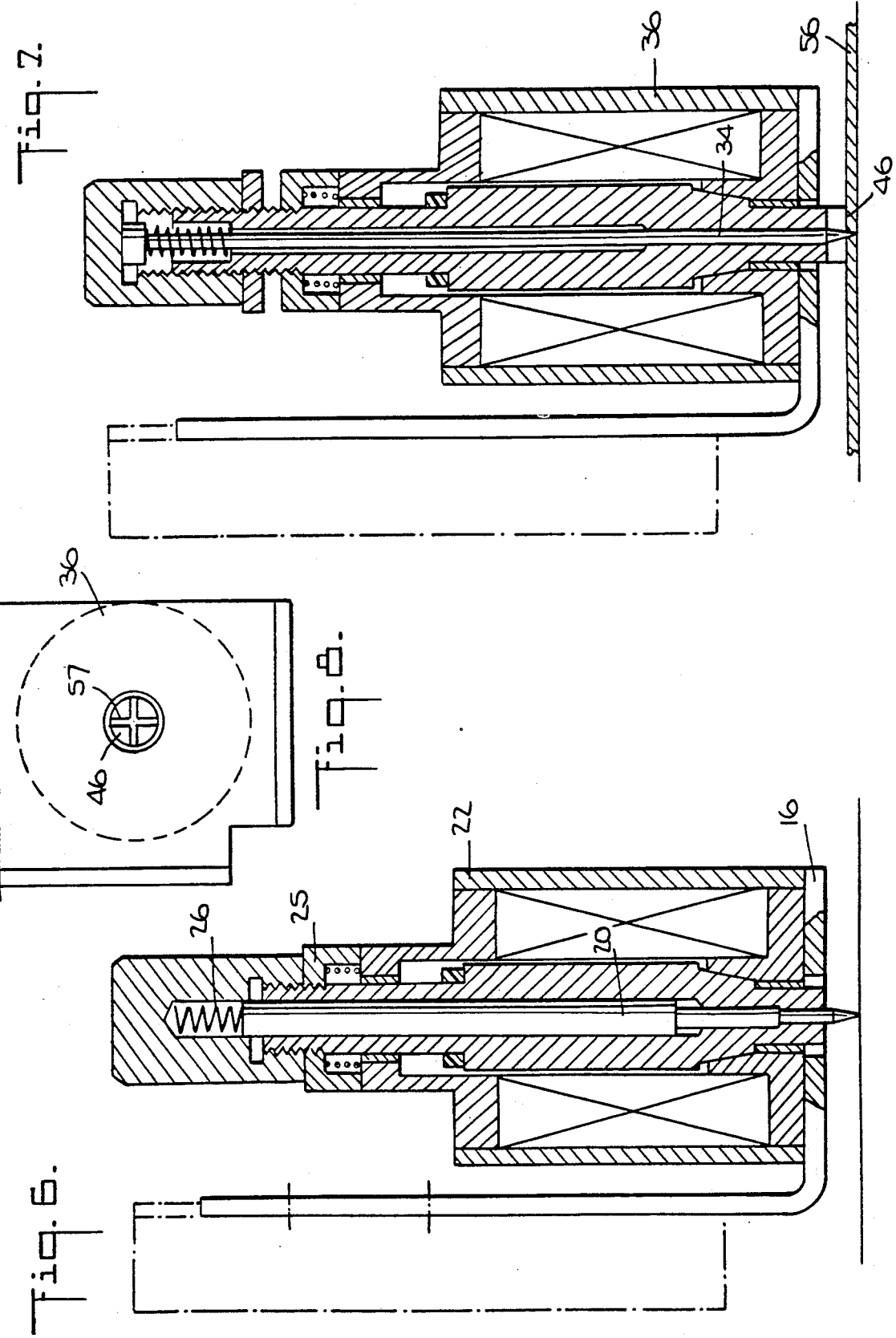

MARKING TOOL DRIVE SYSTEM FOR A DRAWING MACHINE OR SIMILAR TYPE OF MACHINE

FIELD OF THE INVENTION

This invention relates to a drive system for working tools (drawing and ruling) utilized in drawing machines, known as plotters, and in particular for the flat plotter type. More particularly, the present invention is directed to a direct drive system for the working tools of a drawing machine. The working tools generally are of two types: the first is in contact with strip or sheet like material but does not penetrate it, producing a mark on the strip material with a fluid released during contact; the second penetrates the strip material, leaving its mark as a result of the penetration. Both types of tool move over the material, parallel and at right angles to the surface, in response to signals delivered from a controller to associated transmission devices.

BACKGROUND OF THE INVENTION

It is well known that many drives for the working tools of a drawing plotter use indirect drive systems. They apply the drive movement displaced from the axis of the tool, or through intermediate articulated mechanisms which are susceptible to vibration due to the play necessary to their operation. This creates unwanted noise, and sometimes control of the tools is lost which may result in mark areas where they are not required. An indirect type of drive system is described in Spanish Letters Pat. No. 550,267. The following patents also describe drawing tool drive systems of the indirect type: European Pat. No. 0036842; U.S. Pat. No. 4,426,783; U.S. Pat. No. 4,324,047; and U.S. Pat. No. 3,550,276.

OBJECTS OF THE INVENTION

It is an object of the present invention to provide a drive system for the working tools of a drawing plotter or similar type machine which has the following advantages: a very compact system, of low cost, vibration-free, simple, requiring minimal adjustments, and silent operation. This invention is directed to a direct drive system which avoids the problems referred to above, ensuring that the working tools incorporate a minimum of drive mechanisms, so that there is no play, it is possible to remove vibrations, the system is more compact, and there is considerable reduction in operational adjustment.

These and other objects of the present invention will become apparent from the following description and claims in conjunction with the drawings.

SUMMARY OF THE INVENTION

The present invention is directed to an improved drive system for a drawing machine. The drawing machine has a working surface for supporting a strip material, a tool carrier assembly for carrying a working tool having a longitudinal axis, and transmission means for moving the tool carrier assembly over the working surface.

Electromagnetic means are provided for moving the working tool downward toward the working surface upon energizing of the electromagnetic means. Resilient means are provided for moving the working tool upward from the working surface upon deenergizing of the electromagnetic means. A first stroke limit means is provided for limiting the downward movement of the working tool. A second stroke limit means is provided for limiting the upward movement of the working tool.

The electromagnetic means, the resilient means, the first stroke limit means, and the second stroke limit means are all positioned coaxial with the longitudinal axis of the working tool.

The working tool may be a drawing tool and/or a ruling (cutting) tool. Two such drive systems may be disposed in a single tool carrier of a drawing machine with one drive system driving a drawing tool and the other drive system driving a ruling tool.

Preferably, the electromagnetic means is a magnetic core with the working tool fixed within the magnetic core for upward and downward movement with the core. The magnetic core is disposed within a solenoid coil. The magnetic core and solenoid coil are positioned coaxial with the longitudinal axis of the working tool.

Preferably, the resilient means is a spring and at least a portion of both the first stroke limit means and the second stroke limit means is fabricated from a plastic material.

BRIEF DESCRIPTION OF THE DRAWINGS

In the drawings forming part hereof:

FIG. 2 is an elevation view of the working tool assembly in accordance with the present invention;

FIG. 3 is a cross-sectional elevation view of the drawing tool assembly through section 3—3 of FIG. 2;

FIG. 4 is a cross-section of the working tools through section 4—4 of FIG. 2;

FIG. 5 is a perspective view of the drive for the plotter of FIG. 1;

FIG. 6 is an illustration of the drawing tool's position when it is in operation;

FIG. 7 is an illustration of the ruling tool's position when in operation; and

FIG. 8 is a detail of the ruling tool as seen from below.

DETAILED DESCRIPTION

Figure 1:
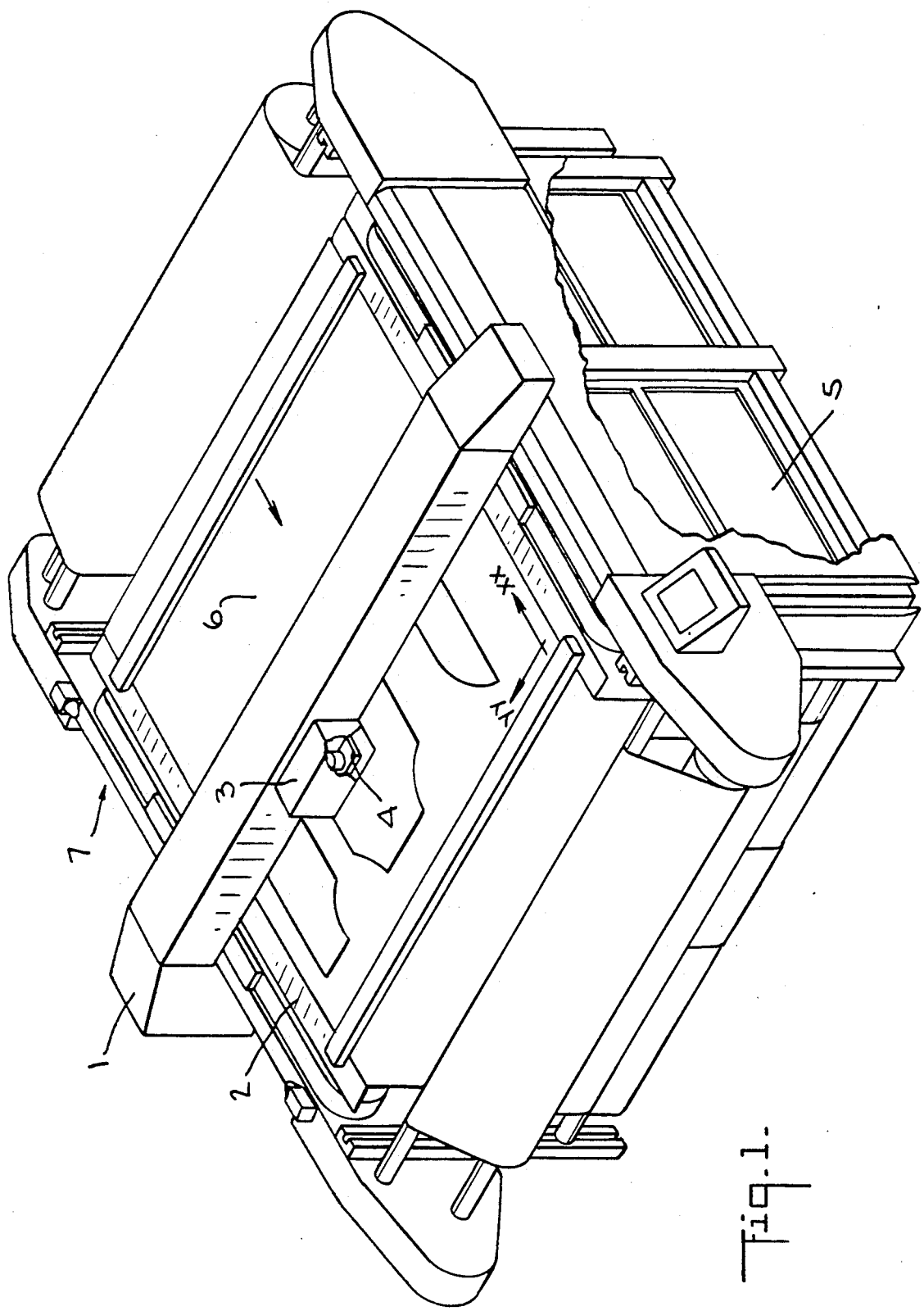
FIG. 1 is a perspective view of an automatically controlled drawing plotter.

In order to facilitate an understanding of the present invention, first a drawing machine will be generally described with reference to FIGS. 1 and 5.

FIG. 1 shows a general diagrammatic view of a drawing machine 1 including a working area. The drawing machine is automatically operated from a controller 5. It includes one or more marker instruments 4 which are carried on a carriage which is what makes up the so called working head 3. This carriage is the unit which permits the correct positioning of the marking tools over the strip material 6 secured on the stationary working surface 7.

FIG. 5 illustrates diagrammatically the flat plotter transmission system, with the servo-motors 55, 51 for the movement of the X and Y axes respectively, and the associated gear systems 54 and 50 which transmit the movement through the pulleys 53 and 49 and the belts 52 and 48 to the X and Y axis carriages.

In particular, this invention relates to the drive system for the working tools used in the drawing machine, often referred to as flat plotters, which generates graphic information on a sector of strip material. The head assembly 3 includes a working instrument 4 (for drawing or ruling) which reacts to the commands sent from a controller 5 to generate graphic information on the drawing paper 6. The controller 5 is the unit which transforms the drawing program into command signals for the motors which move the head, and for the devices which move the working tools. A head assembly 3 is fitted on a Y carriage which moves alternately along the direction marked YY. This unit is fitted on an X carriage 2 which moves alternately along the XX direction indicated in FIG. 1. This allows the head to shift to any position on the table with the combined movement of the X and Y carriages. The machine is fitted with a discrete advance system for the strip material, so that it can generate traces which are longer than the working table as such.

A description now follows of the drive system for the working tools, which is the subject of the present invention, with reference to FIGS. 2, 3, 4, 6, 7, and 8.

FIG. 2 illustrates an elevation view of a flat plotter working head in accordance with the present invention. The head is made up of one or more working tools which includes the drawing 17 and/or ruling 10 tools and which are secured on a support 16 which, in turn, is fixed onto a Y carriage 14.

The tools form a single unit with the support 16 which, in turn, is part of the Y carriage 14, so that when the carriage moves over the working surface, the tools 25 move with it. The support has slides 15 so that it can be moved towards or away from the working surface. This adjustment is done on the machine so that, from the highest point of the working surface 7 to the lower face 8 of the tool support, the minimum play can be left in order to allow the strip material on which the machine is to operate to pass through. The support 16 has two reference surfaces 13 which are complemented by others on the Y carriage 14 so that when the support is adjusted, it can move only along direction Z, at right angles to the working surface. This is because the axis of the working tools is at right angles to the base 8 of the support 16 which, in turn, is at right angles to the seating face 28 (see FIG. 3) of the support on the Y carriage 14. The support 16 has a base with rounded zones 9 which make it easier for the head to pass over the strip material.

FIG. 3 illustrates an elevation view of the drawing tool seen through cross-section 3—3 of FIG. 2. Here, the elements which make up the drawing tool can be seen. The tool comprises an electromagnet body 22 secured at the bottom to the support 16. There are two holes through the body, 30 and 24, housing two friction bushings, 31 and 23, through which the electromagnet core 21, constituting the main body of the drawing tool, can slip. There is a coil 19 inside the solenoid housing 22 which is designed to move the magnetic core 21 of the solenoid downwards until its stroke limiter 25, suitably a plastic material, comes up against the body 22 of the solenoid, as shown in FIG. 6.

The presence of the plastic limiter 25 has the advantage of preventing a sharp knock against the body 22 so that the unit operates more silently. When the core 21 of the solenoid moves to its bottom position, it takes the ball-point 20 with it, because spring 26 keeps it compressed against the surface 18 of the solenoid core 21. The spring 26 also permits the drawing tool or ball point 20 to adapt to any unevenness of the strip material on the working surface with virtually constant pressure.

In some cases, the ball-point may have an additional ink container 11 as shown in FIG. 2. This tank or container 11 is under air pressure since, once the ink has been added, it is pressurized by means of the one-way valve 12. The ball-point rises when the coil 19 (FIG. 3) ceases to operate. The compression spring 27 pushes the limiter 25 upwards, taking the core, and therefore the ball-point, with it, until the stroke limiter 29, suitably a plastic material, comes into contact with the body of the electromagnet 22.

This type of drive has many advantages. On the one hand, the system is highly compact, since all the elements are co-axial with the line of the working instrument itself. Similarly, this means that, when the drive stresses are applied, symmetry is exact. A further significant advantage is in the economics of the design. It is cheaper than the traditional indirect drive systems, and this benefit is clearly related to the small number of components involved. Furthermore, there is the additional advantage that the system requires virtually no adjustments during its operation, the only thing required being the overhead positioning of the carriage (the working head). This is done only when the carriage must be replaced, and that is an infrequent occurrence.

FIG. 4 illustrates an elevation view of the ruling tool as seen along section 4—4 of FIG. 2. In FIG. 4, the elements making up this tool can be seen. The tool comprises an electromagnet body 36 secured at the bottom to support 16. As in the previous case, this body has two holes through it 32 and 39 which house two friction bushings 33 and 38 inside which the electromagnet core 37 making up the main body of the ruling tool can slip. Inside the body 36, there is a coil 35 which is designed to move the electromagnet core 37 downwards until the face 46 of the said electromagnet core 37 rests on the strip material which is to be ruled. This means that, when the coil is activated, the punch 34 which rules the line is introduced into the strip material by the same amount as the punch 34 emerges from the face 46 of the electromagnet core 37. The penetration of the punch into the strip material can be adjusted by turning cap 42 which is in permanent contact with the punch under the influence of a spring 41 which rests on the electromagnet core 37 and presses the punch against the cap 42.

Once this adjustment is made as required for the protrusion of the punch from the electromagnet core 37, this position is fixed by tightening the nut 40 against the cap 42. The ruling tool is raised when the coil 35 is not charged because of the effect of the spring 44 which presses the limiter 43 upwards, taking the whole tool with it. The upward movement is limited by the stroke limiter 45, suitably a plastic material, when it comes into contact with the electromagnetic body 36.

The limiter 43 is adjusted so that surface 46 always comes into contact against the strip material before the limiter 43 touches the electromagnet body 36. Discharges 57 (FIG. 8) can be seen on the surface 46 for the removal of any possible shavings, at the same time as permitting correct and even support on the strip material, so ensuring that deformations which may be caused in the material in the area of the marking line do not remove the point of the punch from the material. The advantages discussed with respect to the drawing tool of FIG. 3 are also present for the ruling tool, and for the same reasons—compactness, low cost, symmetry, uniformity in the application of forces, the small number of parts, and the minimal adjustments. Again, the elements are coaxial with the centerline or longitudinal axis of the ruling tool.

FIG. 6 illustrates a side view of the drawing tool in its working position, i.e. in operation. It shows how the limiter 25 is in contact with the body of the electromagnet 22, and the ball-point 20 can move along its own axis without losing contact with the surface of the strip material, adapting to any possible unevenness in it, as a result of the effect of the spring 26.

FIG. 7 illustrates the ruling tool in its operating position, with the detail of how the surface 46 referred to above is supported on the strip material 56 while the part of the punch 34 protruding from the surface 46 penetrates the strip material which is to be ruled.

FIG. 8 shows the shape of the discharges 57 on the surface 46 of the ruling tool core. As was explained in connection with FIG. 4, these discharges make it possible to remove any shavings, at the same time as guiding the ruling tool with respect to the marking line, so that the axis of one of the discharges is aligned with the marking or cutting line.

Although preferred embodiments of the present invention have been described in detail, it will be appreciated that modifications may be made by one skilled in the art, all within the spirit and the scope of the present invention as defined in the claims.

What is claimed is:

1. In a working tool drive system for a drawing machine wherein said drawing machine has a working surface for supporting a strip material, a tool carrier assembly for carrying a working tool having a longitudinal axis, transmission means for moving said tool carrier assembly over said working surface, the improvement being said working tool drive system comprising:
   electromagnetic means for moving said working tool downward toward said working surface upon energizing of said electromagnetic means;
   first resilient means for moving said working tool upward from said working surface upon deenergizing of said electromagnetic means;
   a first stroke limit means for limiting the downward movement of said working tool;
   a second stroke limit means for limiting the upward movement of said working tool;
   wherein said electromagnetic means, said first resilient means, said first stroke limit means, and said second stroke limit means are all disposed coaxially with said longitudinal axis of said working tool; and
   wherein said working tool is a ruling tool, said ruling tool having a bottom surface for contacting strip material on said working surface, said bottom surface being provided with discharge means for removing waste material and for providing for better seating of the tool.

2. A working tool system according to claim 1 wherein said first resilient means is a spring.

3. A working tool drive system according to claim 1 wherein at least a portion of said first and second stroke limit means is fabricated from plastic material.

4. A working tool drive system according to claim 1 wherein said electromagnetic means includes a magnetic core with said working tool fixed within said core for upward and downward movement with said core, and a solenoid coil with said magnetic core disposed within said solenoid coil, wherein said magnetic core and said solenoid coil are coaxial with said longitudinal axis of said working tool.

5. A working tool drive system according to claim 4 which further includes a first and a second friction bushing spaced from one another receiving and guiding said magnetic core, said first and second friction bushings each being disposed coaxially with said longitudinal axis of said working tool.

6. In a working tool drive system for a drawing machine wherein said drawing machine has a working surface for supporting a strip material, a tool carrier assembly for carrying a working tool having a longitudinal axis, transmission means for moving said tool carrier assembly over said working surface, the improvement being a first and second working tool drive system, each working tool drive system comprising:
   electromagnetic means for moving said working tool downward toward said working surface upon energizing of said electromagnetic means;
   first resilient means for moving said working tool upward from said working surface upon deenergizing of said electromagnetic means;
   a first stroke limit means for limiting the downward movement of said working tool;
   a second stroke limit means for limiting the upward movement of said working tool;
   wherein said electromagnetic means, said first resilient means, said first stroke limit means, and said second stroke limit means are all disposed coaxially with said longitudinal axis of said working tool; and
   wherein said first working tool drive system drives a drawing tool and said second working tool drive system drives a ruling tool, said first and second working tool drive systems being disposed in a single tool carrier assembly.

7. A working tool drive system according to claim 5 wherein said first resilient means is a spring.

8. A working tool drive system according to claim 7 wherein said first working tool drive system further includes second resilient means for permitting said drawing tool to adapt to unevenness of strip material on said working surface with virtually constant pressure, wherein said second resilient means is disposed coaxially with the longitudinal axis of said drawing tool.

9. A working tool drive system according to claim 8 wherein said second resilient means is a spring.

10. A working tool drive system according to claim 5 wherein said electromagnetic means includes a magnetic core with said working tool fixed within said core for upward and downward movement with said core, and a solenoid coil with said magnetic core disposed within said solenoid coil, wherein said magnetic core and said solenoid coil are coaxial with said longitudinal axis of said working tool.

11. A working tool drive system according to claim 5 wherein at least a portion of said first and second stroke limit means is fabricated from plastic material.

12. A working tool drive system according to claim 10 which further includes a first and a second friction bushing spaced from one another receiving and guiding said magnetic core, said first and second friction bushings each being disposed coaxially with said longitudinal axis of said working tool.

13. A working tool drive system according to claim 5 wherein said ruling tool of said second working tool drive system has a bottom surface for contacting strip material on said working surface, said bottom surface being provided with discharge means for removing waste material and for providing for better seating of said ruling tool.

* * * * *